United States Patent [19]

Stenger et al.

[11] Patent Number: 4,944,970
[45] Date of Patent: Jul. 31, 1990

[54] PACKAGING FILM, IN PARTICULAR A SAUSAGE CASING, BASED ON POLYAMIDE

[75] Inventors: Karl Stenger, Ruedesheim; Hans Strutzel, Wiesbaden; Guenther Crass, Taunusstein, all of Fed. Rep. of Germany

[73] Assignee: Hoechst Aktiengesellschaft, Frankfurt am Main, Fed. Rep. of Germany

[21] Appl. No.: 298,060

[22] Filed: Jan. 18, 1989

[30] Foreign Application Priority Data

Jan. 19, 1988 [DE] Fed. Rep. of Germany ....... 3801344

[51] Int. Cl.$^5$ ..................... F16L 11/00; B65D 81/34
[52] U.S. Cl. ................................ 428/34.8; 138/118.1; 426/105; 426/175; 428/35.5; 524/538; 525/425
[58] Field of Search ....................... 525/425; 524/538; 428/34.8, 35.5; 426/105, 135; 138/118.1

[56] References Cited

U.S. PATENT DOCUMENTS

| | | | |
|---|---|---|---|
| 4,120,928 | 10/1978 | Furukawa et al. | 264/171 |
| 4,133,802 | 1/1979 | Hachiboshi et al. | 525/425 |
| 4,243,074 | 1/1981 | Strutzel et al. | 428/34.8 |
| 4,486,507 | 12/1984 | Schumacher | 428/476.1 |
| 4,659,599 | 4/1987 | Strutzel | 428/34.8 |
| 4,764,406 | 8/1988 | Hisazumi et al. | 428/34.8 |
| 4,812,534 | 3/1989 | Blakely | 525/425 |

FOREIGN PATENT DOCUMENTS

| | | |
|---|---|---|
| 56924 | 7/1967 | Fed. Rep. of Germany . |
| G8708867.8 | 10/1987 | Fed. Rep. of Germany . |
| 1102851 | 2/1968 | United Kingdom . |

OTHER PUBLICATIONS

"Amorphe Polyamide aus Terephthalsaeure und verzweigten Diaminen", Von R, Gabler et al., Chimia 21, pp. 65-81, 1967.

*Primary Examiner*—James Seidleck
*Attorney, Agent, or Firm*—Foley & Lardner, Schwartz, Jeffery, Schwaab, Mack, Blumenthal & Evans

[57] ABSTRACT

A tubular, biaxially stretch-oriented packaging film, in particular a sausage casing, comprising a polymer mixture which comprises an aliphatic polyamide, a polyterephthalic acid ester, an aromatic polyamide comprising branched aliphatic diamines having at least 7 carbon atoms and aromatic dicarboxylic acids, or aromatic diamines and aliphatic dicarboxylic acids having 5 to 11 carbon atoms and a dye. The weight amount of the aromatic polyamide is preferably equal to, and particularly preferably greater than, the weight amount of dye. A masterbatch suitable for producing the film is also disclosed. With particular advantage, the film having the above described composition can be dyed deep black or brilliant red.

16 Claims, No Drawings

PACKAGING FILM, IN PARTICULAR A SAUSAGE CASING, BASED ON POLYAMIDE

BACKGROUND OF THE INVENTION

The present invention relates to a biaxially stretch-oriented packaging film, in particular to a tubular artificial sausage casing, which comprises (a) a linear aliphatic polyamide, (b) a polyterephthalic acid ester, (c) an aromatic polyamide comprising a branched aliphatic diamine and an aromatic dicarboxylic acid or an aromatic diamine and an aliphatic dicarboxylic acid, and (d) a dye.

Sausage casings formed from a polymer mixture comprising the above components (a) and (b), and which may contain a dye, are known. Such mixtures are disclosed in EP-A-0,176,980, corresponding to U.S. Pat. No. 4,659,599. However, the strength and expansion properties of the casing are inadequate.

It is known that for the production of dyed plastic films, the dye is added as a masterbatch to the granules of plastic material prior to extrusion, whereby dye concentrations of between 1 and 10%, relative to the amount of plastics, are required to achieve intensive coloring. When dyed tubings are produced from the known polymer mixture of polyamide and polyester, serious difficulties arise on addition of certain dyes in quantities of more than about 1%, relative to the total quantity. The unstretched film obtained by extrusion contains lumps which are due to non-uniform distribution of the color pigments. This results in the formation of holes in the film. Quite frequently, the unstretched film cannot be subjected to subsequent stretching. Even when high forces are applied, stretching is impossible, and the film has a tendency to burst.

Attempts to solve these problems have been made either by employing relatively small amounts of dye resulting in insufficient coloring of the film, or by employing other dyes. The latter alternative is unsatisfactory because of the limited number of suitable dyes. A great number of dyes are not permitted in food packaging materials or should not be used for reasons of environmental safety. Other dyes are thermally unstable and decompose during the extrusion of the plastic melt. A solution to these difficulties has consisted in not dyeing the polymer material at all prior to extrusion, but providing a continuous colored print on the finished film.

DE-C-27 16 710 describes films of polyamide mixtures which are biaxially stretched in stages. These films comprise a linear aliphatic polyamide as the main component and polyamides containing cyclical members as an optional further component. The last-mentioned, ring-containing polyamides are copolymers comprising three different structural units. Examples of such structures are units of aromatic diamines, in particular xylylene diamine groups, or of aromatic dicarboxylic acids, e.g., terephthalic acid.

EP-A-0,065,278 discloses a film comprised of a polyamide mixture, wherein one component is a partly aromatic polyamide and the other component is a linear aliphatic polyamide, such as polyamide-6 or polyamide-6,6. In the partly aromatic polyamide, either the diamine units or the dicarboxylic acid units have an aromatic structure. An example mentioned in the publication is a condensation product from 2,2,4- and 2,4,4-trimethyl-hexamethylene diamine and terephthalic acid.

None of these publications, however, propose a solution to the aforementioned problems.

SUMMARY OF THE INVENTION

Accordingly, it is an object of the present invention to provide a packaging film, suitable for a tubular sausage casing, which has homogeneous color pigment distribution, even at a relatively high color pigment concentration.

Another object of the present invention is to provide a packaging film which is easily stretchable after extrusion.

A further object of the present invention is to provide a packaging film having improved strength and expansion properties.

In accomplishing the foregoing objectives, there has been provided, in accordance with one aspect of the present invention, a tubular, biaxially stretch-oriented packaging film which comprises a polymer mixture comprising (a) a linear aliphatic polyamide, (b) a polyterephthalic acid ester, (c) an aromatic polyamide comprising a branched aliphatic diamine and an aromatic dicarboxylic acid or an aromatic diamine and an aliphatic dicarboxylic acid, and (d) a dye.

In accordance with another aspect of the present invention there is provided a masterbatch suitable for producing said film, which comprises granular plastic particles comprising said aromatic polyamide (c) and a dye.

In accordance with yet another aspect of the present invention there is provided a sausage product comprising a sausage meat emulsion and an artificial sausage casing formed from said film.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

A plastic tubing oriented by biaxial stretching and optionally containing a dye, which is comprised of a support film comprising polyamide/polyester and additionally a further polymer, namely a polyolefin, such as, e.g., polyethylene and polypropylene, has already been disclosed in DE-U-87 08 867.8. This polyolefin is, however, intended to form a vacuole structure within the film, in combination with solid inorganic particles, and thus to impart a pearlescent or metallic lustre to the film.

In accordance with the instant invention, the linear aliphatic polyamide constitutes the main component of the polymer mixture, from which the packaging film is produced. The linear aliphatic polyamide may also comprise a mixture of several polymers of this generic type. Its proportion is about 65 to 85% by weight of the film. Suitable linear aliphatic polyamides include, in particular, polyamides of the general formula (I)

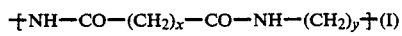

in which x and y denote integers from 2 to 7, with special preference being given to the polyamide where x=y=6 (polyamide-6,6), or polyamides of the general formula (II)

in which z denotes an integer from 4 to 12, z=6 (polycaprolactam, Nylon-6) and z=12 (polyamide-12) being preferred.

For extruding the tubular film, the polyamide should have a relative viscosity in the range from about 2.5 to about 4.5, measured in sulfuric acid (96% strength, at 20° C.).

The proportion of the polyester in the polymer mixture, which may likewise comprise several polyesters, is about 7 to 15% by weight, based on the film. Relative to the amount of polyamide, the proportion of the polyester preferably is about 8 to 14%. The polyterephthalate is a product obtained by condensing aliphatic diols of the formula HO-$(CH_2)_n$-OH (n=2 to 6, preferably n=4) with terephthalic acid and, optionally, small amounts of isophthalic acid and/or aliphatic dicarboxylic acids.

The aromatic polyamide, which is essential in accordance with this invention, is present in an amount of about 4 to 19% by weight, relative to the weight of the film. Its amount is varied as a function of the quantity of dyestuff added and should not be significantly less than the weight amount of the dye. To achieve the desired effect, the amount of aromatic polyamide present in the polymer mixture in general is at least equal to, but preferably higher than, the added amount of dye. The aromatic polyamide contains units which are based on diamines and dicarboxylic acid, whereby essentially only the diamines, but in particular essentially only the dicarboxylic acids possess aromatic nuclei. A preferred aromatic diamine is xylylene diamine, in particular m-xylylene diamine, which is polycondensed with an aliphatic dicarboxylic acid having 5 to 11 carbon atoms, in particular with adipic acid. The preferred aromatic polyamide comprises units of terephthalic acid and isophthalic acid which are polycondensed with branched linear aliphatic diamines having in particular at least 7 carbon atoms. Aromatic polyamides with unbranched linear aliphatic diamine units, for example, hexamethylene diamine units, are not suited to achieve the desired effect.

In a preferred embodiment, these branched aliphatic diamine units are alkyl-substituted hexamethylene diamine units, whereby the total number of carbon atoms in the alkyl grops is at least three. Thus, the alkyl groups comprise at least three methyl groups or one ethyl and one methyl group or one propyl group, in particular one isopropyl group. The methyl and ethyl groups advantageously are in the 2- and 4-position. If only one alkyl group is present, this usually is in the 3-position.

Thus, the alkyl-substituted hexamethylene diamine group can, for example, be varied as follows:

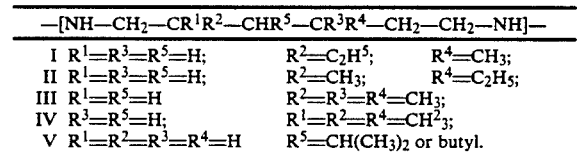

The diamine units I and II or III and IV can be present as isomer mixtures in the polymer chain. Together with units of terephthalic acid, the alkyl-substituted hexamethylene diamine units form the aromatic polyamide.

The aromatic comprises largely amorphous compounds which per se are known (see *Chimia* 21, 1967, pp. 65–81) and which have been used for the production of highly transparent films (DD Patent No. 56,924).

The dye which is homogeneously distributed throughout the polymer material comprises compounds which possess sufficient thermal stability for the melt extrusion process and which can be used with foodstuffs without problem. Preferably, colored pigments resulting in deep black or brilliant red colors are added. These include, in particular, colorants based on perylene and quinacridone compounds and carbonblack pigments. These colorants have a nucleating effect, i.e., without the addition of the aromatic polyamide the problems described at the outset are encountered in the course of film manufacture.

The dye is added to the polymer material prior to the extrusion process, in the form of a masterbatch. Thus, it can be dispersed homogeneously within the polyamide melt, even at relatively high concentrations.

The masterbatch comprises a mixture of the aromatic polyamide and the colored pigments. Within the scope of this invention, the term "masterbatch" defines a mixture, preferably granular, comprising a substantially dust-free concentrate of the aromatic polyamide with a relatively high content of dye. This masterbatch is employed as an intermediate product. Prior to the extrusion process, it is mixed with the dye-free granular polymer mixture comprising aliphatic polyamide and polyester, so that a tubular film containing the desired amount of dye can be produced.

The masterbatch employed in accordance with this invention is a granular plastic material which is comprised of a predominant proportion, i.e., preferably about 60 to 95% by weight, and in particular 70 to 93% by weight, of the aromatic polyamide, and of a minor proportion of dye pigments, in particular red pigments and/or carbonblack pigments. The granules expediently are of cylindrical or lenticular shape. Additives, such as antioxidant, antistatic agents, filler particles and/or stabilizers can also be contained in the masterbatch, in amounts selected such that the desired effect is achieved in each case.

Prior to feeding the complete polymer mixture into the extruder the masterbatch is added to the color pigment-free granules of the polymer mixture comprising (A) aliphatic polyamide and (B) polyterephthalate, in a weight amount selected such that the content of colored pigments and aromatic polyamide desired for the film is realized.

The extruded plastic melt is chilled, so that a tubular unstretched (primary) film is obtained. The primary tubing can be simultaneously stretched in the longitudinal and in the transverse direction without problem, by inflating and drawing. The stretching temperature is in the region of 65 to 85° C. The longitudinal stretching ratio usually is at least 1:2.5, and the transverse stretching ratio usually is at least 1:2.8. The multiaxial stretching is generally followed by heat-setting at a temperature of at least 90° C., which treatment is, for example, carried out with hot air. During this heat treatment the tubing is fixed in its oriented condition, so that it possesses sufficient thermal stability for any later heat treatment, such as is customarily performed during the sausage production. If appropriate, the tubular film comprises several layers. In this case, the polymer mixture constitutes the support layer, while the other layers serve to improve special properties of the tubular film and reduce, for example, the permeability to gas or increase the sealing the sealing strength. The tubular film has a film thickness of about 10 to 50 μm, in particular of about 25 to 45 μm; the tubing diameter is selected in accordance with the customary sausage diameters. For wrapping paste-like food, and in particular for stuffing with sausage compositions, the tubular film is divided into individual sections which are closed at one end or is shirred to give a shirred stick. The tubular film has a circular cross-section and has the shape of a straight cylinder or, alternatively, is bent to give a ring casing. The uniform cross-section of the packaging film is maintained even when the stuffed casing is subjected to a treatment with hot water. After cooling down, well-stuffed, crease-free sausages are obtained.

The packaging film is distinguished by excellent dimensional stability under the action of hot water and good elastic properties so that it closely adjoins the cooled-down stuffing.

The invention will now be explained in greater detail by means of the Examples which follow.

EXAMPLE 1

The masterbatch employed comprised 90% by weight of an aromatic, granular polyamide and 10% by weight of carbonblack pigment. The aromatic polyamide was comprised of units of terephthalic acid diamine units of the formulae

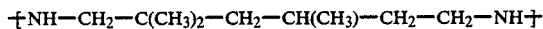

and

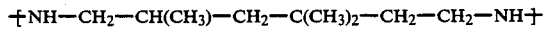

whereby the two isomeric diamine units are present at a weight ratio of 1:1.

A dry blend comprising
80% by weight of polyamide-6 (granular)
10% by weight of polybutylene terephthalate (granular) and
10% by weight of masterbatch
was melt-extruded through a ring die and chilled so that an unstretched tubing having a diameter of 13 mm was obtained. It was heated to the stretching temperature required and biaxially stretched without any problem by means of a gas blown into the interior of the tubing. The stretching was performed simultaneously in both directions and could be run continuously and without technical problems. The resulting tubular casing had a diameter of 44 mm and, at a carbonblack content of 1%, exhibited a uniform deep black color.

EXAMPLE 2

20 p.b.w. (parts by weight) of a masterbatch prepared from 80% by weight of the granular, aromatic polyamide of Example 1 and 20% by weight of a red color pigment (PV Fast Red from Hoechst AG) were mixed with
70 p.b.w. of polyamide-6 and
10 p.b.w. of polybutylene terephthalate.
and melt-extruded through a ring die. The chilled unstretched tubing had a diameter of 13 mm. As described in Example 1, the tube was heated to the desired stretching temperature and subject to biaxial simultaneous stretching which could be performed without difficulty by means of a gas cushion blown into the interior of the tubing. Stretching could be carried out continuously and without technical problems. The resulting, signalred tubular casing had a diameter of 44 mm. The color pigments were uniformly distributed in the tubing material.

COMPARATIVE EXAMPLES

In accordance with the procedure described for Examples 1 and 2, polymer blends having the following compositions were extruded through a ring die, and the unstretched tubings obtained were cooled down;

| | | | |
|---|---|---|---|
| (1) 89.0 | p.b.w. | of polyamide-6 (granular), | |
| 7.6 | p.b.w. | of polybutylene terephthalate (granular), | |
| 3.4 | p.b.w. | of masterbatch, comprised of 70% by weight of polyester granules and 30% by weight of carbonblack pigment | |
| (2) 86.6 | p.b.w. | of polyamide-6 (granular), | |
| 10.0 | p.b.w. | of polybutylene terephthalate (granular), | |
| 3.4 | p.b.w. | of masterbatch, comprised of 70% by weight of polyester granules and 30% by weight of carbonblack pigment | |
| (3) 80 | p.b.w. | of polyamide-6 (granular), | |
| 10 | p.b.w. | of polybutylene terephthalate (granular), | |
| 10 | p.b.w. | of masterbatch, comprised of 60% by weight of polyamide-6 granules and 40% by weight of red pigment. | |

None of the tubings obtained from the above polymer blends could be stretched. This was probably due to the strong crystallization-promoting action of the color pigments employed. By using the aromatic polyamide as matrix for the masterbatch containing the color pigment, the tendency to crystallization was apparently reduced and the dispersion of the color pigments in the film was facilitated, which made higher color pigment concentrations possible.

We claim:

1. A tubular, biaxially stretch-oriented packaging film which comprises a polymer mixture comprising:
   (a) a linear aliphatic polyamide,
   (b) a polyterephthalic acid ester,
   (c) an aromatic polyamide comprising the reaction product of (i) a branched aliphatic diamine and an aromatic dicarboxylic acid or (ii) an aromatic diamine and an aliphatic dicarboxylic acid, and
   (d) a dye.

2. A packaging film as claimed in claim 1, wherein said aromatic polyamide (c) comprises the reaction product of (i) a branched aliphatic diamine having at least 7 carbon atoms and an aromatic dicarboxylic acid, or (ii) an aromatic diamine and an aliphatic dicarboxylic acid having 5 to 11 carbon atoms.

3. A packaging film as claimed in claim 2, wherein said branched aliphatic diamine of said reaction product (i) comprises alkyl-substituted hexamethylene diamine units whereby the total number of carbon atoms contained in the alkyl substituent groups of each of said hexamethylene diamine units is at least three.

4. A packaging film as claimed in claim 3, wherein said alkyl groups are methyl, ethyl or propyl groups, and are the same as or different from each other.

5. A packaging film as claimed in claim 4, wherein said hexamethylene diamine units are substituted at the 2- and 4-positions with at least three methyl groups or at least one methyl and one ethyl group.

6. A packaging film as claimed in claim 4, wherein said hexamethylene diamine units are substituted at the 3-position with at least one ethyl, propyl or butyl group.

7. A packaging film as claimed in claim 2, wherein said aromatic dicarboxylic acid of said reaction product (i) comprises terephthalic acid or isophthalic acid.

8. A packaging film as claimed in claim 2, wherein said aromatic diamine of said reaction product (ii) is xylylene diamine.

9. A packaging film as claimed in claim 2, wherein said aliphatic dicarboxylic acid of said reaction product (ii) is adipic acid.

10. A packaging film as claimed in claim 1, wherein said linear aliphatic polyamide (a) comprises polyamide-6,6, Nylon-6 or polyamide-12.

11. A packaging film as claimed in claim 1, wherein said linear aliphatic polyamide (a) has a relative viscosity in the range from about 2.5 to 4.5, measured in 96% sulfuric acid at 20° C.

12. A packaging film as claimed in claim 1, wherein said polyterephthalic acid ester (b) is polybutylene terephthalate.

13. A packaging film as claimed in claim 1, wherein said polymer mixture comprises from about 65 to 85% by weight of said linear aliphatic polyamide (a), from about 7 to 15% by weight of said polyterephthalic acid ester (b), from about 4 to 19% by weight of said aromatic polyamide (c), and from about 0.5 to 10% by weight of said dye (d).

14. A packaging film as claimed in claim 13, wherein the weight amount of said aromatic polyamide (c) is not less than the weight amount of said dye (d).

15. A packaging film as claimed in claim 13 comprising from 8 to 14% by weight of said polyterephthalic acid ester (b).

16. A sausage product comprising a sausage meat emulsion and an artificial sausage casing formed from a packaging film as claimed in claim 1.

* * * * *